United States Patent [19]

Baylor

[11] 4,407,551

[45] Oct. 4, 1983

[54] REPLACEABLE WEAR COVER FOR TRACK BUSHING

[75] Inventor: John M. Baylor, Bettendorf, Iowa

[73] Assignee: J. I. Case Company, Racine, Wis.

[21] Appl. No.: 269,128

[22] Filed: Jun. 1, 1981

[51] Int. Cl.³ .............................................. B62D 55/08
[52] U.S. Cl. ........................................ 305/57; 305/60; 474/206
[58] Field of Search ............... 474/156, 206, 231, 901; 305/35 R, 57, 58 R, 60

[56] References Cited

U.S. PATENT DOCUMENTS

| | | | |
|---|---|---|---|
| 1,186,785 | 6/1916 | Holt | 474/901 X |
| 1,258,612 | 3/1918 | Holt | 474/901 X |
| 1,634,647 | 7/1927 | Bens | 474/206 |
| 3,359,044 | 12/1967 | Boggs | 305/57 |
| 4,030,782 | 6/1977 | Baylor | 305/57 |
| 4,114,467 | 9/1978 | Petershack | 305/58 R X |
| 4,129,045 | 12/1978 | Kishitani | 474/231 |

FOREIGN PATENT DOCUMENTS 2852116  6/1979  Fed. Rep. of Germany ........ 305/57
833547   4/1960  United Kingdom .................. 305/57

Primary Examiner—David A. Scherbel
Attorney, Agent, or Firm—Cullen, Sloman, Cantor, Grauer, Scott & Rutherford

[57] ABSTRACT

A replaceable wear cover for track chain bushings which covers and protectively shields the track bushing such that the wear cover, rather than the bushing, directly engages the metallic outer radial portions of the chain-driving sprocket wheel. The wear cover may be made of heat treated steel or like material for long life and includes noise suppression and impact absorbing elastomeric members for reducing noise and impact resulting from driving engagement with the sprocket wheel. A mounting portion of the replaceable wear cover is attached to the inner surface of the track plate by one or more fasteners that pass through the track plate and wear cover mounting portion or by using the same fasteners which attach the track plate to the track links. The wear cover includes a shield portion having depending legs for covering the standard track bushing and which are sprung apart for installation or removal, thereby insuring a tight fit on the bushing.

5 Claims, 4 Drawing Figures

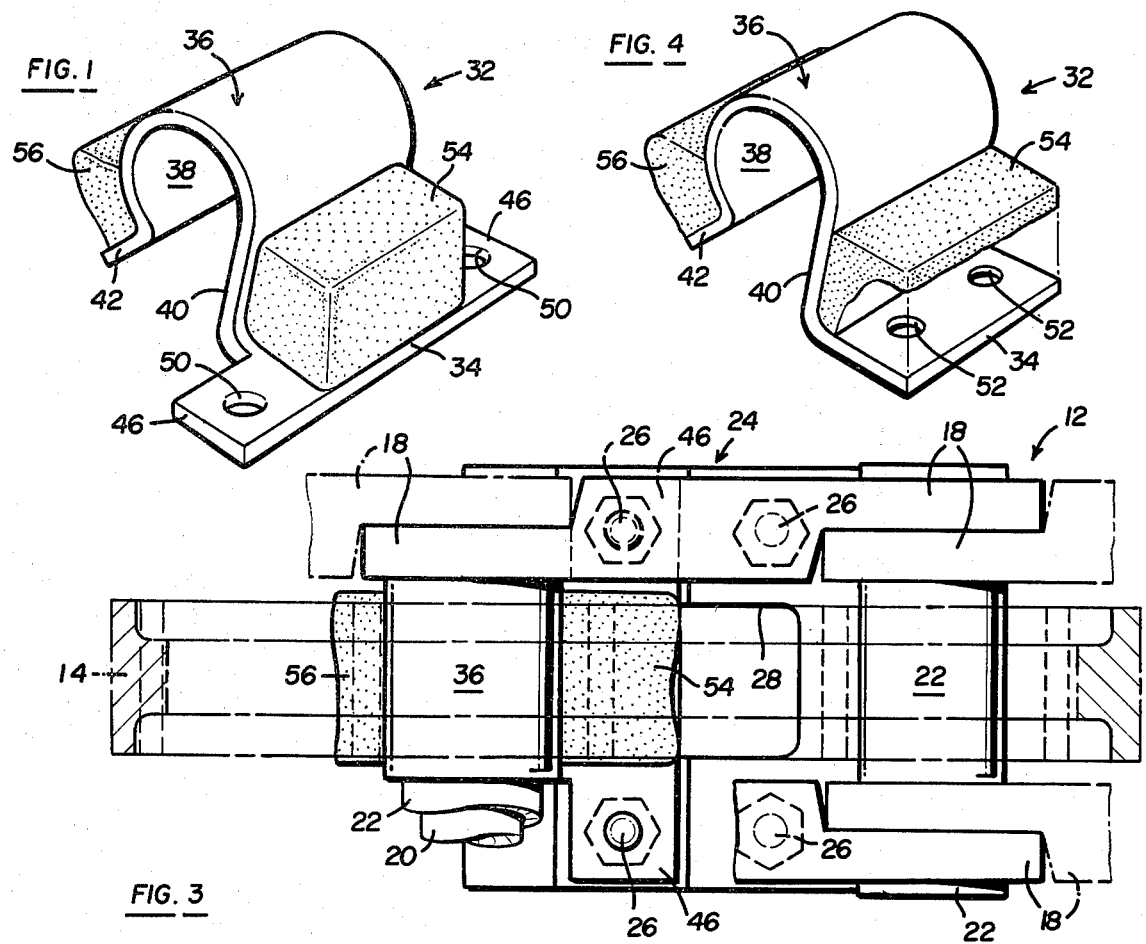
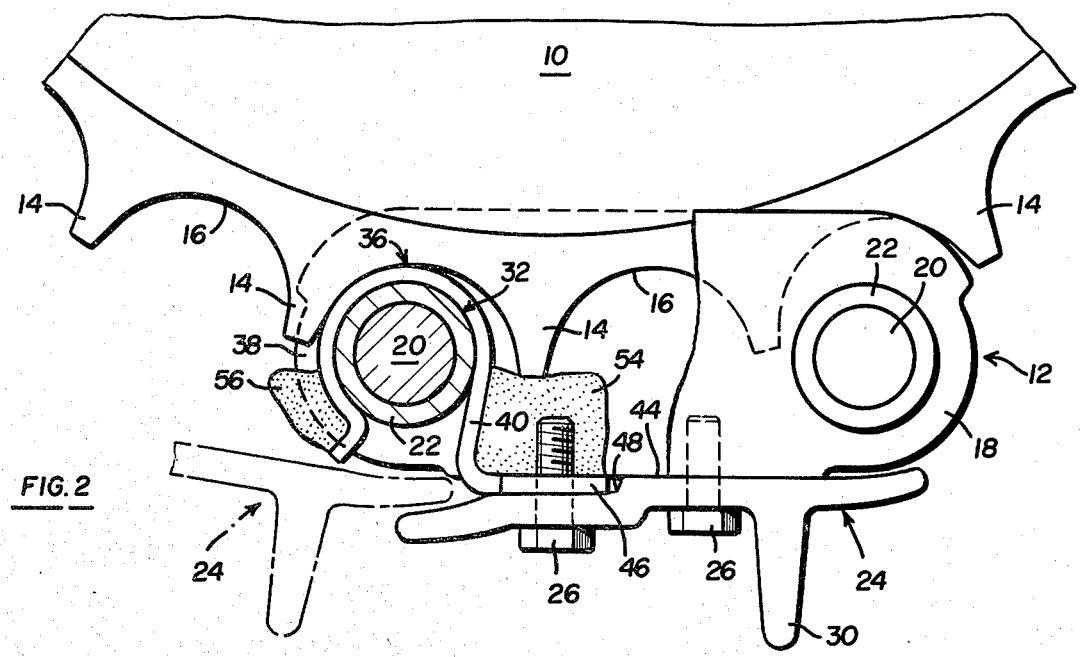

REPLACEABLE WEAR COVER FOR TRACK BUSHING

BACKGROUND OF THE INVENTION

The present invention relates to endless tracks for crawler tractors and more particularly to a replaceable wear cover for covering the standard bushings between track links thereby imparting improved wear and operating characteristics to the assembly.

Conventional endless tracks for use with crawler tractors comprise a series of track links interconnected by pins fitted within external bushings. In such constructions, the track links have an inner rail surface upon which the track rollers and idler wheels roll. The pin and bushing connections for these conventional structures provide a drive means for coaction with a chain-driving sprocket whereby the track is forceably driven by rotational movement of the sprocket.

While this type of driving arrangement for endless tracks has been used for many years, there are several shortcomings including the excessive wear on the bushings which directly engage the metallic outer radial portions of the teeth on the sprocket wheel. The bushings have been subject to cracking due to high impact loads occurring when they make contact with the sprocket and also due to the scrubbing action of the bushings against the sprocket as the track is driven. Another shortcoming is the excessive noise created by the bushings impacting upon the drive sprocket during operation of the tractor. Thus, track life has been limited because of the wear on the bushings by the drive sprocket due to the metal-to-metal contact and scrubbing action.

Accordingly, it is an object of the present invention to protectively shield the track chain bushings with a replaceable wear cover which directly engages the metallic outer radial portions of the sprocket wheel. Another object of the present invention is to provide the replaceable wear cover with noise suppression and impact absorbing means for reducing noises emanating from the forceful engagement of the track chain bushings with the sprocket wheel.

SUMMARY OF THE INVENTION

In accordance with the present invention, a replaceable wear cover for track chain bushings is provided which directly engages the outer radial portions of the sprocket wheel to protectively shield the track chain bushings thereby increasing their work life. The replaceable wear cover includes noise suppression and impact absorbing elastomeric members for reducing noises emanating from the engagement of the sprocket wheel with the track chain bushings.

The wear cover includes a generally flat or planar mounting portion and a shield portion which is generally U-shaped in longitudinal cross-section and having depending legs for fitting around the standard track bushing. The cover may be made of a heat treated steel for long life which eliminates the need for heat treating the standard bushing. The depending legs of the shield portion are sprung apart for installation or removal, thereby insuring a tight fit on the standard bushing.

The mounting portion of the replaceable wear cover is attached to the inner surface of the track plate by one or more fasteners that pass through the track plate and wear cover mounting portion or by using the same fasteners which attach the track plate to the track links.

When attaching the wear cover to the track links, the mounting portion of the cover is provided with laterally disposed mounting ears that are sandwiched between the ends of the track links and a recessed portion of the track plate. Thus, the wear cover may be secured by one or more fasteners through the track plate or by using the same fasteners that mount the track plate to the track links.

Elastomeric block-shaped members made of rubber or like resilient material are secured to the opposed sides of the wear cover shield portion for engagement with the sprocket teeth ends prior to the engagement between the wear cover and sprocket wheel. With this arrangement, the sprocket engages and compresses an elastomeric member, depending upon the direction of its rotation, before it engages the wear cover thereby providing noise attenuation.

The elastomeric members extend substantially between the track links, may be molded or otherwise secured to the wear cover, and are readily accessible for replacement when necessary. A depending lip on one end of the wear cover provides reinforcement for one of the elastomeric members to hold it in place. Thus, the elastomeric members reduce the noise occasioned by metal-to-metal contact between the wear cover and sprocket wheel and abate the substantial impact from such contact.

Other advantages and meritorious features of the replaceable wear cover for track bushings of the present invention will be more fully understood from the following description of the invention, the appended claims, and the drawings, a brief description of which follows.

BRIEF DESCRIPTION OF DRAWINGS

FIG. 1 is a perspective view of the replaceable wear cover for track bushings of the present invention and illustrating mounting ears permitting attachment of the wear cover to the track links.

FIG. 2 is a side elevational view, partially in cross-section, showing the replaceable wear cover, a sprocket wheel portion, and a portion of the track chain.

FIG. 3 is a partial plan view of FIG. 2.

FIG. 4 is a perspective view of the replaceable wear cover without the mounting ears.

DETAILED DESCRIPTION OF THE INVENTION

A preferred embodiment of the replaceable wear cover for track bushings made in accordance with the teachings of the present invention is illustrated in FIGS. 1-4.

The drawings illustrate a crawler tractor track chain assembly which has the usual sprocket wheel 10 rotatably mounted on a tractor (not shown), in any conventional manner, for driving the track chain 12. The sprocket 10 includes radially extending teeth 14 separated by circumferentially disposed spaces 16 between the teeth as is conventional.

The track chain 12 includes a plurality of vertical, laterally spaced apart links 18 which are disposed in pairs along the length of the chain. The ends of the links 18 are pivotally interconnected by connections including pins 20 and bushings 22 surrounding the pins, all for connecting the links 18 in end-to-end relationship as is conventional.

A track plate 24 spans the track links 18 and is attached to the track links by suitable fasteners 26 extending through the plate and into the links 18. Track plate 24 is provided with its usual dirt passageway opening 28 and lug 30 for ground engagement and traction.

The present invention relates to a replaceable wear cover 32 which partially surrounds, covers, and protectively shields the track chain bushing 22 such that wear cover 32, rather than bushing 22, directly engages the metallic outer radial portions 16 of the sprocket wheel 10. Wear cover 32 includes a generally flat or planar mounting portion 34 which spans between track links 18 and a shield portion 36 which is generally U-shaped in longitudinal cross-section and includes leg portions 38 and 40.

Wear cover 32 may be made of a heat treated steel for long life which eliminates the need for heat treating the standard bushing 22. The shield portion 36 is sprung part at its leg portions 38 and 40 for installation or removal thereby insuring a tight fit on standard bushing 22. Wear cover 32 includes a depending lip 42 at one end such that an operator may insert a tool between the lip 42 and bushing 22 or between lip 42 and leg portion 40 for spreading shield portion 36 apart to permit installation or removal.

The replaceable wear cover 32 of the present invention may be attached to the inner surface 44 of track plate 24 by using the same fasteners 26 which attach track plate 24 to links 18 as illustrated in FIGS. 2 and 3. Referring to FIGS. 1 and 2, wear cover 32 includes laterally disposed mounting ears 46 which are sandwiched between the ends of track links 18 and the recessed portion 48 of track plate 24. Fasteners 26 pass through track plate 24 and apertures 50 in mounting ears 46 for attachment to track links 18.

Alternatively, as shown in FIG. 4, the mounting ears 46 may be eliminated and wear cover 32 would then be attached to track plate 24 by fasteners (not shown) that pass through track plate 24 and apertures 52 in the planar portion 34 of wear plate 32. Thus, wear cover 32 is constructed to fit between track links 18 and is secured by one or more fasteners through apertures 52 as shown in FIG. 4 or by using the same fasteners 26 that mount track plate 24 to links 18 as shown in FIG. 2.

Elastomeric block-shaped members 54 and 56 made of rubber or like resilient material are secured to the opposed sides of shield portion 36 for engagement with the ends of sprocket teeth 14 prior to the engagement between the wear cover 32 and sprocket wheel 10. With this arrangement, sprocket wheel 10 engages and compresses either elastomeric member 54 or 56, depending upon the direction of its rotation, before it engages wear cover 32, thereby providing noise attenuation.

Elastomeric members 54 and 56 extend substantially between track links 18, may be molded or otherwise secured to wear cover 32, and are readily accessible for replacement when necessary. The depending lip 42 of wear cover 32 provides reinforcement for elastomeric member 56 to hold it in place during compression by the sprocket teeth 14. Thus, elastomeric members 54 and 56 reduce the noise occasioned by metal-to-metal contact between wear cover 32 and sprocket wheel 10 and abate the substantial impact force from such contact.

As described, wear cover 32 can be made from a heat treated steel or other like material for long life which eliminates the need for heat treating the standard bushing 22. Further, cover 32 provides a wear surface for direct engagement with sprocket wheel 10 which may be easily installed or replaced as necessary without removing the track chain 12 or replacing pins 20 and bushings 22.

It will be apparent to those skilled in the art that the foregoing disclosure is exemplary in nature rather than limiting, the invention being limited only by the appended claims.

I claim:

1. In an endless track assembly of the type used on a machine provided with a drive sprocket having teeth separated by circumferentially disposed spaces between the teeth, said track assembly including a pair of laterally spaced apart track links interconnected by at least one pin fitted within an external bushing, a track plate removably attached by fasteners to said track links, the improvement comprising:
   a replaceable wear cover including a generally planar mounting portion which is mounted between said track links and a curved shield portion fitted partially around the outer surface of said bushing, said shield portion directly engaging the circumferentially disposed spaces between the sprocket teeth to protectively shield the bushing against impact with the sprocket thereby increasing its work life; and
   elastomeric block-shaped members secured to opposed sides of said shield portion for engaging the ends of said sprocket teeth prior to the engagement between said wear cover and sprocket.

2. The track assembly as defined in claim 1 wherein said shield portion is generally U-shaped in longitudinal cross-section and includes depending legs which fit partially around the outside of said bushing, said depending legs being sprung apart for installation of said wear cover to said bushing thereby insuring a tight fit between said shield portion and the outer surface of said bushing.

3. The track assembly as defined in claim 1 wherein said mounting portion includes laterally disposed mounting ears which are sandwiched between the track links and a recessed portion of said track plate and attached to said track plate and track links by said fasteners.

4. The track assembly as defined in claim 1 wherein said mounting portion includes apertures permitting attachment of the wear cover to one side of said track plate.

5. The track assembly as defined in claim 1 wherein one end of said wear cover includes a depending lip for supporting one end of one of said elastomeric members and said lip providing a tool engaging surface for the removal of said wear cover from said bushing.

* * * * *